(12) United States Patent
Kariya et al.

(10) Patent No.: US 11,431,094 B2
(45) Date of Patent: Aug. 30, 2022

(54) WIRELESS COMMUNICATION DEVICE

(71) Applicant: TORAY INDUSTRIES, INC., Tokyo (JP)

(72) Inventors: Yoshihiro Kariya, Shiga (JP); Kenta Noguchi, Shiga (JP); Hiroji Shimizu, Shiga (JP); Seiichiro Murase, Shiga (JP); Hisashi Nishikawa, Shiga (JP)

(73) Assignee: TORAY INDUSTRIES, INC., Tokyo (JP)

( * ) Notice: Subject to any disclaimer, the term of this patent is extended or adjusted under 35 U.S.C. 154(b) by 131 days.

(21) Appl. No.: 16/978,490

(22) PCT Filed: Mar. 4, 2019

(86) PCT No.: PCT/JP2019/008406
§ 371 (c)(1),
(2) Date: Sep. 4, 2020

(87) PCT Pub. No.: WO2019/172186
PCT Pub. Date: Sep. 12, 2019

(65) Prior Publication Data
US 2021/0057822 A1    Feb. 25, 2021

(30) Foreign Application Priority Data

Mar. 9, 2018 (JP) .............................. JP2018-042688

(51) Int. Cl.
*H01Q 1/24* (2006.01)
*H01Q 7/00* (2006.01)
(Continued)

(52) U.S. Cl.
CPC ............. *H01Q 7/00* (2013.01); *H01Q 1/2283* (2013.01); *H04B 1/59* (2013.01); *H04B 5/0031* (2013.01); *H04B 5/02* (2013.01)

(58) Field of Classification Search
CPC ........... G06K 19/0715; G06K 19/0701; G06K 19/0723; G06K 19/07773; H01Q 1/2283;
(Continued)

(56) References Cited

U.S. PATENT DOCUMENTS

| 7,616,158 B2 * | 11/2009 | Mak ...................... H01Q 1/243 343/702 |
| 2003/0080899 A1 * | 5/2003 | Lee ...................... H01Q 3/2682 342/368 |

(Continued)

FOREIGN PATENT DOCUMENTS

| CN | 1649364 A | 6/2005 |
| CN | 102165670 A | 8/2011 |

(Continued)

OTHER PUBLICATIONS

Chinese Office Action and Search Report for Chinese Application No. 201980015172.7, dated Feb. 23, 2021, with English translation.

(Continued)

*Primary Examiner* — Thien M Le
(74) *Attorney, Agent, or Firm* — Birch, Stewart, Kolasch & Birch, LLP (57) ABSTRACT

A wireless communication device includes: an antenna for transmitting and receiving a radio wave, a rectifying circuit that is connected to the antenna and rectifies the radio wave received by the antenna to generate voltage, an internal circuit that operates by the voltage generated by the rectifying circuit, and a switch circuit that is disposed contactlessly with respect to the antenna and operates on the basis of an output signal of the internal circuit, wherein the switch circuit includes a coupling wiring and a switch element, and the operation of the switch element varies the impedance of the antenna so that communication can be carried out.

15 Claims, 10 Drawing Sheets

(51) Int. Cl.
*H01Q 1/22* (2006.01)
*H04B 1/59* (2006.01)
*H04B 5/00* (2006.01)
*H04B 5/02* (2006.01)

(58) Field of Classification Search
CPC .......... H01Q 7/00; H04B 1/59; H04B 5/0031; H04B 5/0062; H04B 5/02; H02J 50/20
See application file for complete search history.

(56) References Cited

U.S. PATENT DOCUMENTS

| | | | |
|---|---|---|---|
| 2005/0178835 A1 | 8/2005 | Akiho et al. | |
| 2006/0050007 A1* | 3/2006 | Min | H01Q 21/30 343/702 |
| 2007/0146221 A1* | 6/2007 | Oshiyama | H01Q 1/243 343/895 |
| 2009/0009405 A1 | 1/2009 | Rofougaran | |
| 2009/0251383 A1* | 10/2009 | Tani | H01Q 9/42 343/756 |
| 2010/0109968 A1* | 5/2010 | Suzuki | H01Q 1/243 343/895 |
| 2011/0210620 A1 | 9/2011 | Shinoda et al. | |
| 2012/0001701 A1 | 1/2012 | Taniguchi et al. | |
| 2013/0249479 A1* | 9/2013 | Partovi | H02J 50/70 320/108 |
| 2015/0054701 A1* | 2/2015 | Kim | H01Q 5/378 343/750 |
| 2018/0026197 A1 | 1/2018 | Shimizu et al. | |
| 2018/0048049 A1* | 2/2018 | Toivanen | H01Q 1/2291 |
| 2018/0225486 A1 | 8/2018 | Teruyama | |
| 2019/0199145 A1* | 6/2019 | Zeine | H04B 5/0037 |

FOREIGN PATENT DOCUMENTS

| | | |
|---|---|---|
| CN | 102341956 A | 2/2012 |
| CN | 204143481 U | 2/2015 |
| CN | 107431096 A | 12/2017 |
| EP | 1 469 549 A1 | 10/2004 |
| JP | 2004-54515 A | 2/2004 |
| JP | 2007-58381 A | 3/2007 |
| JP | 2007-74139 A | 3/2007 |
| JP | 2007-104325 A | 4/2007 |
| JP | 2015-159656 A | 9/2015 |
| WO | WO 2017/038319 A1 | 3/2017 |

OTHER PUBLICATIONS

Extended European Search Report for European Application No. 19764540.1, dated Apr. 1, 2021.
International Search Report, issued in PCT/JP2019/008406, PCT/ISA/210, dated May 21, 2019.
Written Opinion of the International Searching Authority, issued in PCT/JP2019/008406, PCT/ISA/237, dated May 21, 2019.

* cited by examiner

WIRELESS COMMUNICATION DEVICE

TECHNICAL FIELD

The present invention relates to wireless communication devices.

BACKGROUND ART

In recent years, there have been an increasing number of contactless wireless communication devices that receive power from a radio signal (radio wave) to operate. Among others, development has been promoted for wireless communication systems using RFID (Radio Frequency IDentification) technology for tags for wireless communication devices.

An RFID tag has a semiconductor integrated circuit device, such as an IC chip, and an antenna for communication with a wireless transceiver called a reader/writer. An antenna mounted in an RFID tag receives a radio wave transmitted from a reader/writer, and the received radio wave is rectified by a rectifying circuit to generate internal power-supply voltage. This internal power-supply voltage is supplied to the internal circuit in the IC chip to operate the tag.

Communication from an RFID tag to a reader/writer is carried out, for example, by varying the input impedance of the RFID tag to vary the electrical energy of the radio wave reflected to the reader/writer. When this takes place, the antenna impedance of the RFD tag is varied, according to a known technology, by varying the operating condition of a switch in a switch unit that is provided in the RFID tag and enabled to switch over between the short circuit condition and the open condition.

For example, Patent Literature 1 provides: an electrical power system composed of a power-receiving matching circuit unit and a power-receiving unit that are connected to an antenna; and a switch unit composed of two capacitors connected in parallel with the electrical power system and an MOSFET; and a frequency detection circuit connected to the switch unit to detect the frequency of a received signal received by the antenna. The frequency detection circuit detects the frequency of a received signal received by the antenna and accordingly varies the operating condition of the switch, thus varying the condition of the circuit including the antenna to vary the antenna impedance.

According to Patent Literature 2, an RFID tag includes a modulation unit that modulates transmission data that is transmitted to a reader/writer, wherein the modulation unit is configured as a diode switch and connected to an antenna. Changing the switch over between on and off in accordance with the transmission data varies the antenna between termination with the antenna impedance and termination in the open condition.

CITATION LIST

Patent Literature

Patent Literature 1: JP2015-159656A
Patent Literature 2: JP2004-54515A

SUMMARY OF INVENTION

Technical Problem

According to Patent Literature 1, however, the other terminal of the capacitor is connected to the communication circuit, and thus, short-circuiting the switch causes the communication system and the electrical power system to be separated and accordingly have no influence to each other any longer. According to such a technology, the operation that supplies electric current to the internal circuit stops during transmission processing of a response signal. An RFID tag contains a condenser such as of a capacitor, and when electric current supply to the internal circuit decreases electric charge stored in the capacitance is supplied to the internal circuit, but such an RFID tag has a problem in that, when electric current supply to the internal circuit decreases below the operating voltage of the internal circuit, the operation of the internal circuit stops.

According to Patent Literature 2, the switch turned into a conductive condition in transmitting a response signal from an RFID tag to a reader/writer withdraws electric current that is used to supply power-supply voltage in the internal circuit of the RFID tag. This poses a problem in that electric current to be supplied as power-supply voltage is abandoned, resulting in failing to efficiently utilize power from a received radio wave.

An object of the present invention is to provide a wireless communication device which makes it possible that, when a response signal is transmitted from an RFID tag to a reader/writer, power-supply voltage is stably supplied from a radio wave received by an antenna to an internal circuit of the RFID tag.

Solution to Problem

To solve the above-mentioned problems, the present invention has the below-mentioned configuration.

That is, the present invention is a wireless communication device characterized by including:

an antenna for transmitting and receiving a radio wave, a rectifying circuit that is connected to the antenna and rectifies the radio wave received by the antenna to generate voltage, an internal circuit that operates by the voltage generated by the rectifying circuit, and a switch circuit that is disposed contactlessly with respect to the antenna and operates on the basis of an output signal of the internal circuit, wherein the switch circuit includes a wiring and a switch element, and the operation of the switch element varies the impedance of the antenna.

Advantageous Effects of Invention

The present invention makes it possible that, when a response signal is transmitted from an RFID tag to a reader/writer, power-supply voltage is stably supplied from a radio wave received by an antenna to an internal circuit of the RFID tag.

DESCRIPTION OF EMBODIMENTS

Below, embodiments for carrying out the present invention (hereinafter referred to as "embodiments") will be described with reference to the accompanying drawings. In this regard, the drawings are schematic. In addition, the present invention is not limited to the below-described embodiments.

Embodiment 1

Figure 1:
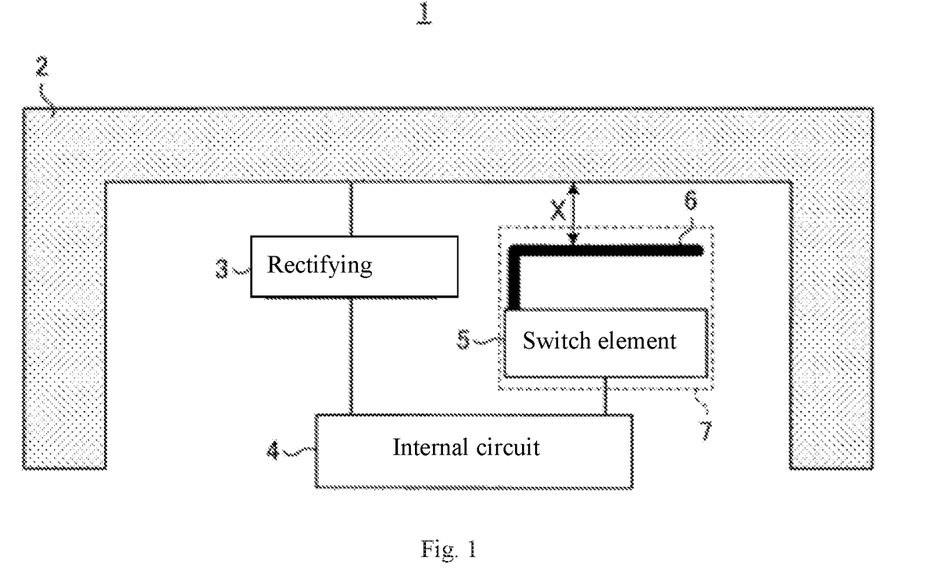
FIG. 1 is a schematic diagram depicting the structure of a wireless communication device according to an embodiment 1 of the present invention.

FIG. 1 is a schematic diagram depicting a wireless communication device according to an embodiment 1 of the present invention. A wireless communication device 1 is composed of an antenna 2, a rectifying circuit 3, an internal circuit 4, and a switch circuit 7 including a switch element 5 and a wiring 6. The antenna 2 is connected to the input side of the rectifying circuit 3, the output side of the rectifying circuit 3 is connected to the input side of the internal circuit 4, and the output side of the internal circuit 4 is connected to the switch element 5. The wiring 6 is a coupling wiring, connected to the switch element 5, and contactless with respect to the antenna 2. The coupling wiring 6 is a conductor at least a part of which is disposed contactlessly near the antenna 2 and conducts high-frequency energy to the antenna 2 through electrostatic or inductive coupling. Furthermore, at least a part of the coupling wiring 6 is preferably disposed near and generally in parallel with the antenna 2. The coupling wiring 6 is used so that the resonance or impedance characteristics of the antenna 2 can be varied by shorting one end or both ends of the coupling wiring 6. A method of connecting the switch element 5 and the coupling wiring 6 may be any of those which can cause electrical continuity. A material to be used for the connection may be any conductive material that can be commonly used. The width and thickness of the connecting portion may be arbitrarily selected.

The antenna 2 transmits and receives a radio wave to and from a reader/writer. The antenna 2 may be any of those which can be commonly used, such as a dipole antenna, loop antenna, or patch antenna. The antenna 2 depicted in FIG. 1 is C-shaped and one example only, and the material for the antenna 2 and the shape of the antenna 2 are each not limited to any particular one.

A method of forming the antenna 2 is not limited to any particular one, and examples thereof include methods using a known technology such as resistance heating evaporation, electron beam, sputtering, plating, CVD, ion plating coating, inkjet, or printing.

Further examples include a coating method in which a coating liquid composed of a material for forming the antenna is utilized. Specific examples of coating methods include a method in which a coating liquid is applied to an insulated substrate using a technology such as a spin coating method, blade coating method, slit die coating method, screen printing method, bar coater method, casting method, transfer printing method, or immersion and withdrawal method, and then dried using an oven, hot plate, infrared light, or the like to be formed. Such coating methods are preferable from the viewpoint of production cost and adaptability to a large area.

Furthermore, a conductive film produced using the above-mentioned method may be patterned using a known photolithography method or the like to have a desired shape, or patterned via a mask having a desired shape during vapor deposition or sputtering.

The rectifying circuit 3 rectifies a radio wave received by the antenna 2 to generate voltage. This voltage is supplied as internal circuit power-supply voltage to the internal circuit 4 and the like.

The rectifying circuit 3 may have any configuration which forms a known rectifying circuit, such as what is called a half-wave rectifying circuit or a full-wave rectifying circuit. For example, a voltage doubler rectifying circuit 10 depicted in FIG. 2 may be used. The voltage doubler rectifying circuit 10 is composed of diodes 11 and 12 and capacitors 13, 14, and 15. An antenna, which is not shown, is connected to the input terminals A and B of the voltage doubler rectifying circuit 10, and the output terminals C and D are connected to the internal circuit, which is not shown. In the voltage doubler rectifying circuit 10, the inputs (A and B) of the rectifying circuit connected to the antenna 2 and the rectifying outputs (C and D) connected to the internal circuit 4 and the switch element 5 operate at different electrical potentials.

Figure 3:
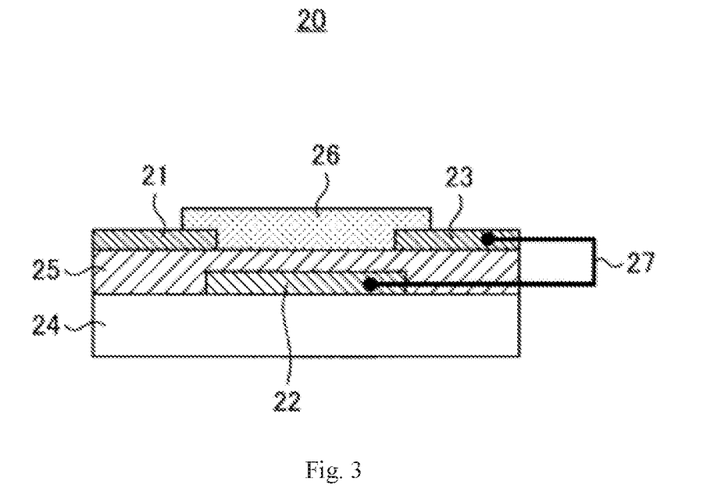
FIG. 3 is a cross-sectional view depicting the configuration of a diode-connected field-effect transistor included in a wireless communication device according to an embodiment of the present invention.

In addition, the diodes 11 and 12 may each be any known diode element, and examples thereof include a diode-connected field-effect transistor 20 depicted in FIG. 3. The diode-connected field-effect transistor 20 has a source electrode 21, gate electrode 22, drain electrode 23, substrate 24, insulating layer 25, and semiconductor layer 26. The gate electrode 22 is electrically insulated from the source electrode 21 by the insulating layer 25, and electrically connected to the drain electrode 23 by, for example, a wiring 27. The semiconductor layer 26 is formed between the source electrode 21 and the drain electrode 23.

The diode-connected field-effect transistor 20 depicted in FIG. 3 has what is called a bottom-contact bottom-gate structure, but may have another structure such as of a bottom-contact top-gate type, top-contact bottom-gate type, or top-contact top-gate type. Materials for the electrodes, substrate, and insulating layer may each be any such material, and the film thickness, width, and the like can be arbitrarily selected.

A method of forming the electrodes is not limited to any particular one, but the same method as the above-mentioned method of forming an antenna can be utilized.

A method of forming the insulating layer is not limited to any particular one, and examples include a method in which a composition containing a material for forming an insulating layer is applied to a substrate and dried, followed by heat-treating the resulting coating film, if necessary. Examples of coating methods include known coating methods such as a spin coating method, blade coating method, slit die coating method, screen printing method, bar coater method, casting method, transfer printing method, immersion and withdrawal method, and inkjet method.

The temperature for heat-treating the coating film is preferably in the range of from 100 to 300° C.

In addition, a material for the semiconductor layer is not limited to any particular one, and may be any such material, such as an elemental semiconductor, compound semiconductor, organic semiconductor, or nanocarbon material, and an organic semiconductor and a nanocarbon material are preferable from the viewpoint of, for example, good electrical characteristics, fast responsiveness, and cost reduction made possible by coating formation.

As a result of studies vigorously made by the present inventors, application of the present technology makes it possible that power-supply voltage is stably supplied to the internal circuit even in the rectifying element having a semiconductor coating layer having lower rectifying characteristics than silicon. Accordingly, the rectifying circuit 3 preferably includes a rectifying element having a semiconductor coating layer from the viewpoint of, for example, cost reduction made possible by coating formation, and more preferably includes a rectifying element having a semiconductor layer containing carbon nanotubes (CNTs), wherein a conjugated polymer is attached to at least a part of the surface of the carbon nanotube. The condition wherein a conjugated polymer is attached to at least a part of the surface of the CNT means the condition wherein a part or the whole of the surface of the CNT is covered with a conjugated polymer. The reason why the CNT can be covered with a conjugated polymer is presumably because the π-electron clouds derived from the conjugated structures of both are superposed one on the other, thus causing interaction. Whether the CNT is covered with a conjugated polymer can be judged from the reflected color of the covered CNT that becomes nearer the color of the conjugated polymer than the color of the uncovered CNT. Elemental analysis such as X-ray photoelectron spectroscopy (XPS) makes it possible to quantitatively identify the existence of attached matter and the weight ratio of the attached matter to the CNTs.

In addition, the conjugated polymer preferably has a weight-average molecular weight of 1000 or more from the viewpoint of the readiness to be attached to the CNTs. Here, the conjugated polymer refers to a compound the repeating unit of which has a conjugated structure and the polymerization degree of which is 2 or more.

Allowing a conjugated polymer to be attached to at least a part of the surface of the CNT makes it possible to uniformly disperse the CNTs in a solution, without compromising the high electrical characteristics of the CNTs. In addition, a coating method makes it possible that a CNT film having CNTs uniformly dispersed therein is formed from a solution having CNTs uniformly dispersed therein. This allows the film to achieve high semiconductor characteristics.

Examples of methods of allowing a conjugated polymer to be attached to a CNT include: (I) a method in which CNTs are added to and mixed with a melted conjugated polymer; (II) a method in which a conjugated polymer is dissolved in a solvent, and CNTs are added to and mixed with the resulting solution; (III) a method in which CNTs are pre-dispersed in a solvent by ultrasonic waves or the like, and a conjugated polymer is added to and mixed with the resulting dispersion: and (IV) a method in which a conjugated polymer and CNTs are added to a solvent, and the resulting mixture system is irradiated with ultrasonic waves and mixed. In the present invention, any one of the methods may be used, and a plurality of the methods may be used in combination.

Examples of conjugated polymers include, but are not limited particularly to, polythiophene-based polymers, polypyrrole-based polymers, polyaniline-based polymers, polyacetylene-based polymers, poly-p-phenylene-based polymers, and poly-p-phenylene vinylene-based polymers. A preferably used conjugated polymer is a chain of monomer units of one type, but a polymer obtained by block copolymerization or random copolymerization of monomer units of different types can also be used. It is also possible to use a polymer obtained by graft polymerization.

The semiconductor layer can be formed using a dry method such as resistance heating evaporation, electron beaming, sputtering, or CVD, but it is preferable to use a coating method from the viewpoint of production cost and adaptability to a large area. Specific examples of methods that can be preferably used include a spin coating method, blade coating method, slit die coating method, screen printing method, bar coater method, casting method, transfer printing method, immersion and withdrawal method, and inkjet method, and a coating method can be selected in accordance with desired coating film characteristics obtained by thickness control, orientation control, and the like of the coating film. In addition, the formed coating film may be annealed in the atmosphere, under reduced pressure, or in an atmosphere of an inert gas such as nitrogen or argon.

Figure 2:
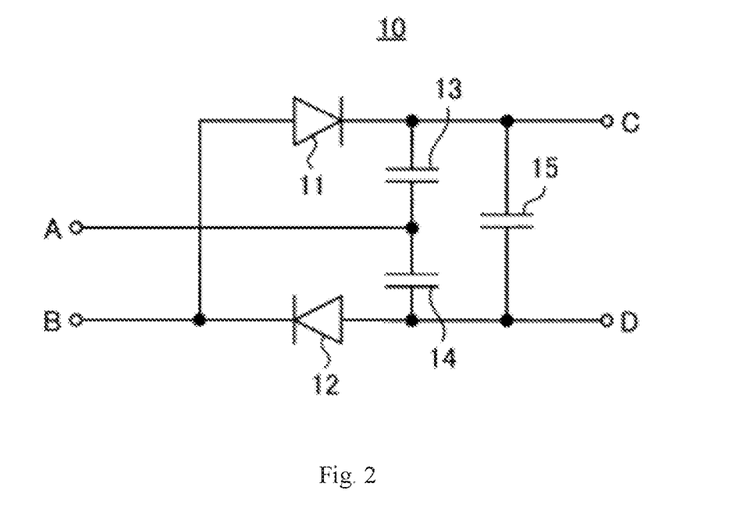
FIG. 2 is a circuit diagram depicting a voltage doubler rectifying circuit included in a wireless communication device according to an embodiment of the present invention.

The capacitors 13, 14, and 15 may each be any of those which are commonly used, and a material to be used for such a capacitor and the shape thereof are each not limited to any particular one. A method of forming a capacitor is not limited to any particular one, and examples thereof include the same method as the above-mentioned methods of forming an electrode and of forming an insulating layer. In addition, the capacitance value of each capacitor only needs to be suitably selected.

The rectifying circuit 3 may further include a power-supply voltage control circuit including a regulator and the like. The power-supply voltage control circuit stabilizes the voltage rectified by the rectifying circuit 3 and stabilizes the internal power-supply voltage, and the circuit configuration, material, shape, and the like may each be any of those which are commonly used.

The internal circuit 4 includes a control circuit, memory circuit, demodulation circuit, and the like. The internal circuit 4 is driven by the power-supply voltage supplied from the rectifying circuit 3 and operates in response to a command transmitted from a reader/writer. For example, the internal circuit 4 demodulates various commands and the like transmitted from a reader/writer, converts them to digital signals, discriminates the commands, and, if necessary, carries out data read/write to and from a memory circuit. The switch element 5 is operated in accordance with the response data.

The circuit configuration of the control circuit, memory circuit, demodulation circuit, and the like may be any of those which are commonly used, and a material to be used and the shape thereof are each not limited to any particular one. In this regard, the memory circuit is composed of a nonvolatile memory such as an EEPROM (Electrically Erasable and Programmable Read Only Memory) and stores various data and the like.

The switch circuit 7 includes at least the switch element 5 and the coupling wiring 6. The switch element 5 is provided between the internal circuit 4 and the coupling wiring 6. As depicted in FIG. 1, the coupling wiring 6 is not connected to or in contact with the antenna 2 or any other circuit or wiring except at the point of connection with the switch element 5.

Figure 4:
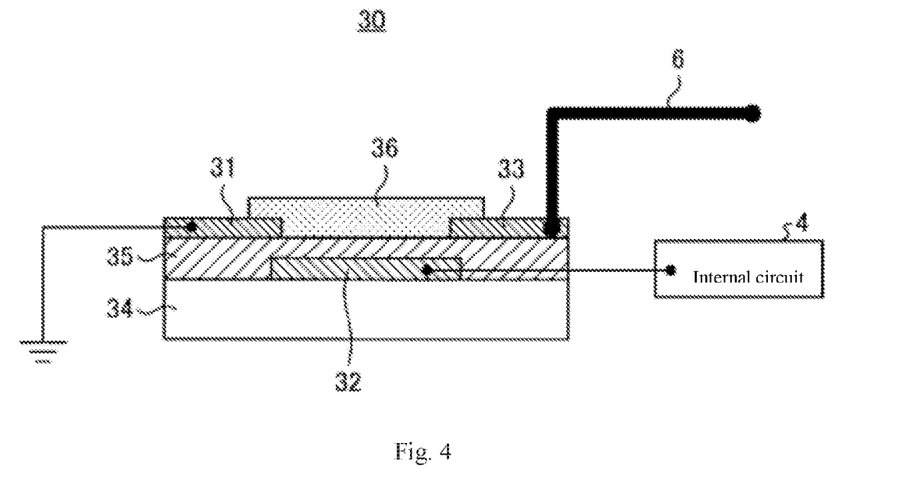
FIG. 4 is a cross-sectional view depicting the configuration of a field-effect transistor included in a wireless communication device according to the embodiment 1 of the present invention.

The switch element 5 may be any of those which switch over between the ON condition and the OFF condition in response to the operation of the internal circuit 4, and is composed of, for example, a field-effect transistor. FIG. 4 depicts a switch element composed of a field-effect transistor 30. The field-effect transistor 30 has a source electrode 31, gate electrode 32, drain electrode 33, substrate 34, insulating layer 35, and semiconductor layer 36. The gate electrode 32 is electrically insulated from the source electrode 31 and the drain electrode 33 by the insulating layer 35. The semiconductor layer 36 is formed between the source electrode 31 and the drain electrode 33. The gate electrode 32 is electrically connected to the output side of the internal circuit 4, and the drain electrode 33 is electrically connected to the coupling wiring 6. The source electrode 31 is connected to a reference potential.

The field-effect transistor 30 depicted in FIG. 4 has what is called a bottom-contact bottom-gate structure, but may have another structure such as of a bottom-contact top-gate type, top-contact bottom-gate type, or top-contact top-gate type. Materials for the electrodes, substrate, and insulating layer may each be any such material, and the film thickness, width, and the like can be arbitrarily selected.

In addition, a material for the semiconductor layer 36 is not limited to any particular one, and may be any such material, such as an elemental semiconductor, compound semiconductor, organic semiconductor, or nanocarbon material, and an organic semiconductor and a nanocarbon material are preferable from the viewpoint of, for example, good electrical characteristics, fast responsiveness, and cost reduction made possible by coating formation.

In addition, a material to be used for the field-effect transistor 30 and a method of forming each of the layers included in the field-effect transistor 30 are the same as those for the field-effect transistor 20.

A material to be used for the coupling wiring 6 may be any conductive material. From the viewpoint of enhancing efficiency in use of materials and from the viewpoint of using less kinds of materials, a material to be used for the coupling wiring 6 is preferably the same as the material to be used for the antenna 2.

The shape of the coupling wiring 6 is, for example, L-shaped as depicted in FIG. 1, and can be suitably adjusted for efficient communication with a reader/writer. In this case, the wiring width, length, and the like can also be suitably adjusted.

In a wireless communication device according to the present embodiment 1, turning the switch element 5 into the ON condition causes the impedance of the antenna 2 to be varied by the effect of electrostatic coupling between the antenna 2 and the coupling wiring 6 or by the like, and varies the electrical energy of the radio wave reflected to a reader/writer, thus carrying out communication. In this case, disposing the antenna 2 and the switch circuit 7 contactlessly between each other makes it possible that the switch element 5 withdraws, from the rectifying circuit 3, less electric current for power-supply voltage supply, that is, that a decrease in power-supply voltage is reduced. This makes it possible that power-supply voltage is stably supplied from a radio wave received by the antenna 2 to the internal circuit 4 also when a response signal is transmitted to a reader/writer.

Here, in cases where the shortest distance between the antenna 2 and the switch circuit 7, that is, the shortest distance X between the antenna 2 and the coupling wiring 6 is a distance having approximately a half wavelength or less of a communication radio wave, the impedance of the antenna 2 is efficiently varied. In addition, the shorter the shortest distance X, the more preferable, from the viewpoint of communication sensitivity. Specifically, the distance is preferably 1 cm or less, more preferably 5 mm or less. For example, in cases where the frequency of a communication radio wave is 920 MHz, the shortest distance X is preferably 300 μm or less. On the other hand, from the viewpoint of the power-receiving performance of the antenna 2, the shortest distance X preferably maintains a suitable distance and is preferably, for example, 10 μm or more.

(Variation 1)

Figure 5:
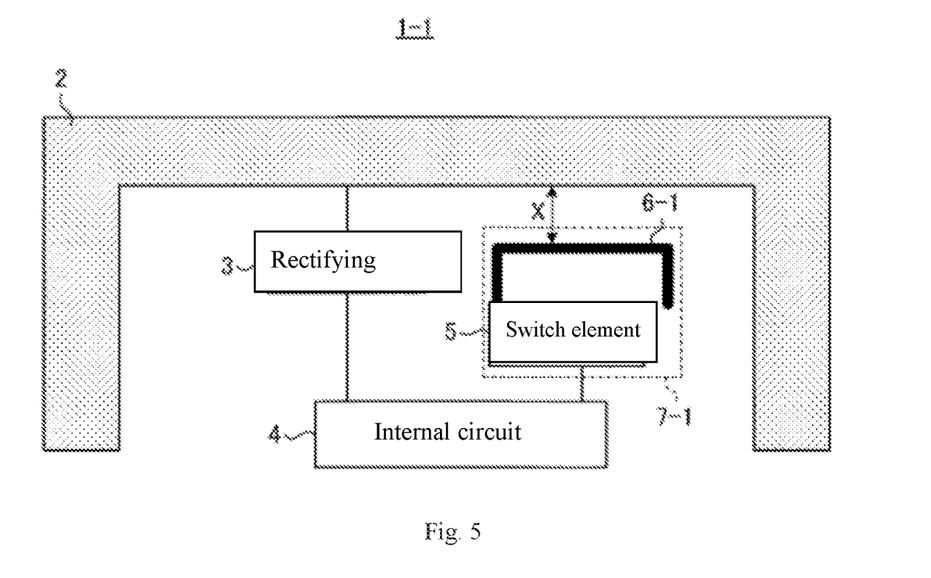
FIG. 5 is a schematic diagram depicting the structure of a wireless communication device according to a variation 1 of the embodiment 1 of the present invention.

FIG. 5 is a diagram depicting the structure according to a variation 1 of the embodiment 1. In a wireless communication device 1-1 depicted in FIG. 5, the coupling wiring 6-1 in the switch circuit 7-1 is C-shaped generally similarly to the antenna 2 along the antenna 2. In this case, the wiring width, length, and the like of the coupling wiring 6-1 are freely selected and can be suitably adjusted.

(Variation 2)

Figure 6:
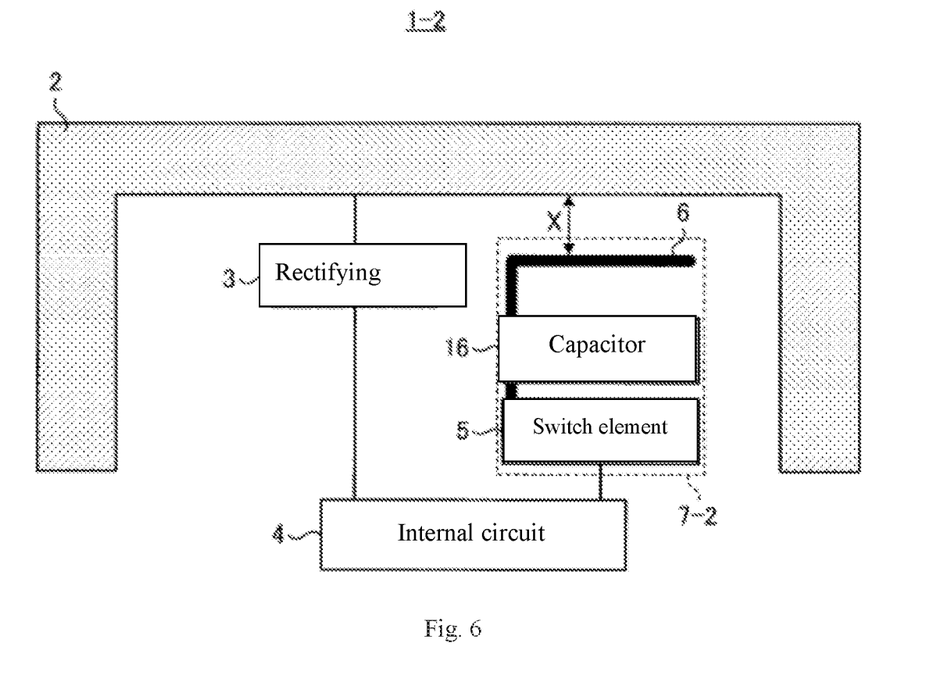
FIG. 6 is a schematic diagram depicting the structure of a wireless communication device according to a variation 2 of the embodiment 1 of the present invention.

FIG. 6 is a diagram depicting the structure according to a variation 2 of the embodiment 1. In a wireless communication device 1-2 depicted in FIG. 6, a capacitor 16 is inserted between the switch element 5 and the coupling wiring 6 in the switch circuit 7-2. In this case, the wiring width, length, and the like are arbitrarily selected and can be suitably adjusted. In addition, the capacitor 16 only needs to be a capacitance component and is not limited to any of those which are commonly used, and a material to be used and the shape thereof are each not limited to any particular one. A method of forming a capacitor is not limited to any particular one, and examples thereof include the same method as the above-mentioned methods of forming an electrode and of forming an insulating layer. In addition, the number of capacitors to be inserted is not limited to one but may be two or more, and the capacitance value of each capacitor only needs to be suitably selected.

These are only examples, and the coupling wiring may be in arbitrary shape and only needs to be configured not to be connected to or in contact with the antenna 2 or any other circuit or wiring except at the point of connection with the switch element 5.

Embodiment 2

Figure 7:
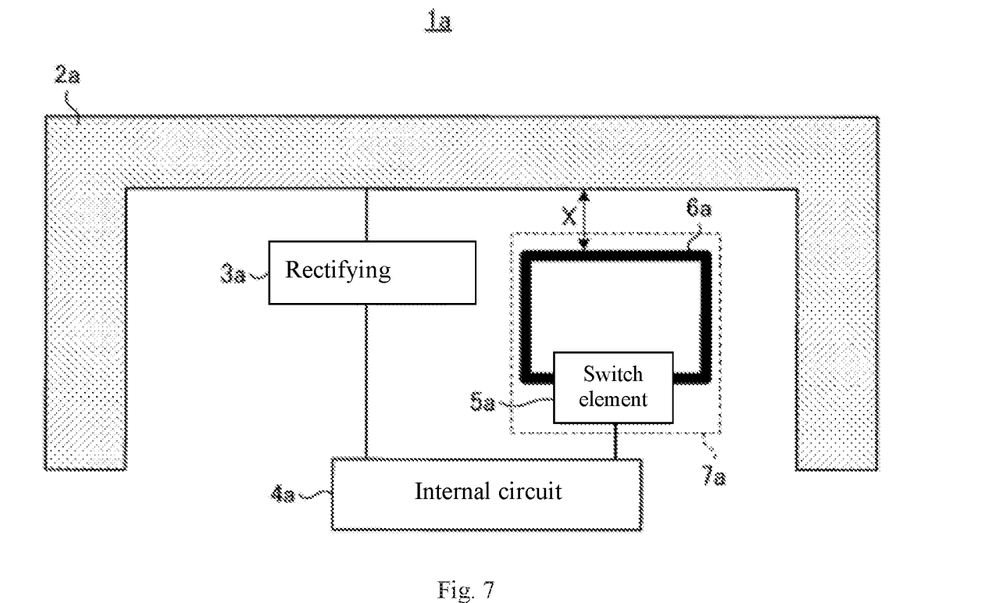
FIG. 7 is a schematic diagram depicting the structure of a wireless communication device according to an embodiment 2 of the present invention.

A wireless communication device according to an embodiment 2 of the present invention has a structure depicted in FIG. 7. A wireless communication device 1a depicted in FIG. 7 includes an antenna 2a, rectifying circuit 3a, internal circuit 4a, and switch circuit 7a. The switch circuit 7a has a switch element 5a and a coupling wiring 6a. The configurations of the rectifying circuit 3a and the internal circuit 4a are the same as the configurations of the rectifying circuit 3 and the internal circuit 4 described in the embodiment 1 respectively.

In the wireless communication device 1a, the coupling wiring 6a of the switch circuit 7a is loop-shaped. That is, both ends of the coupling wiring 6a are connected to the switch element 5a. In this regard, the coupling wiring 6a is not connected to or in contact with the C-shaped antenna 2a or any other circuit or wiring except with the switch element 5a.

Figure 8:
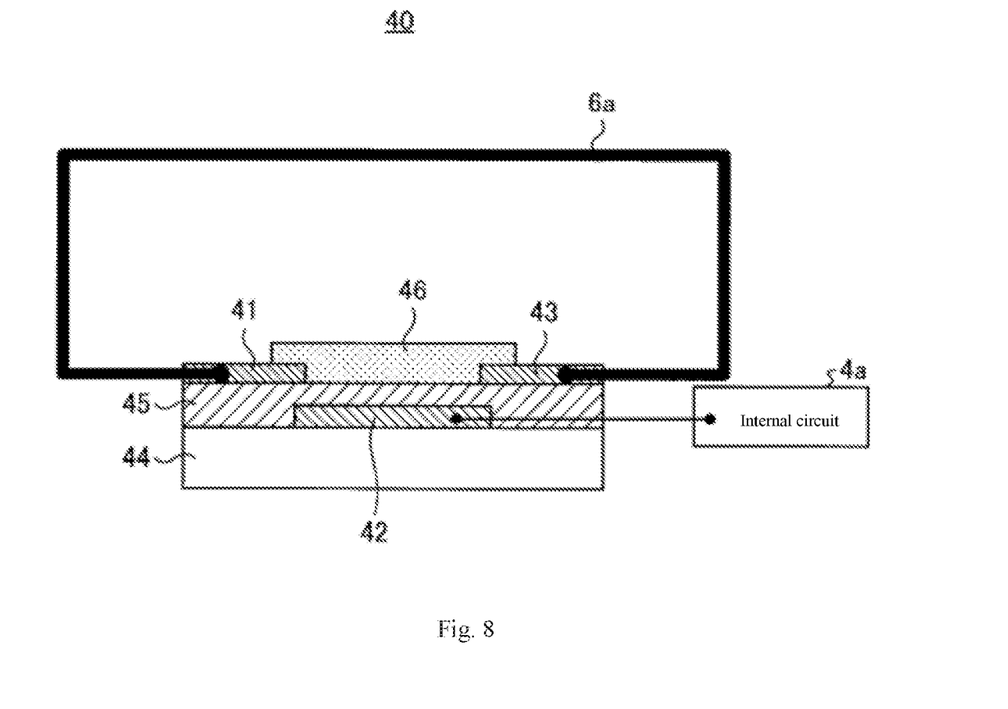
FIG. 8 is a cross-sectional view depicting the configuration of a field-effect transistor included in the wireless communication device according to the embodiment 2 of the present invention.

The switch element 5a may be any of those which switch over between the ON condition and the OFF condition in response to the operation of the internal circuit 4a, and is composed of, for example, a field-effect transistor. FIG. 8 depicts the switch element 5a composed of a field-effect transistor 40. The field-effect transistor 40 has a source electrode 41, gate electrode 42, drain electrode 43, substrate 44, insulating layer 45, and semiconductor layer 46. The gate electrode 42 is electrically insulated from the source electrode 41 and the drain electrode 43 by the insulating layer 45. The semiconductor layer 46 is formed between the source electrode 41 and the drain electrode 43. The gate electrode 42 is electrically connected to the output side of the internal circuit 4a, and the drain electrode 43 is electrically connected to the coupling wiring 6a. The other end of the coupling wiring 6a is electrically connected to the source electrode 41.

The field-effect transistor 40 depicted in FIG. 8 has what is called a bottom-contact bottom-gate structure, but may have another structure such as of a bottom-contact top-gate type, top-contact bottom-gate type, or top-contact top-gate type.

(Variation 1)

Figure 9:
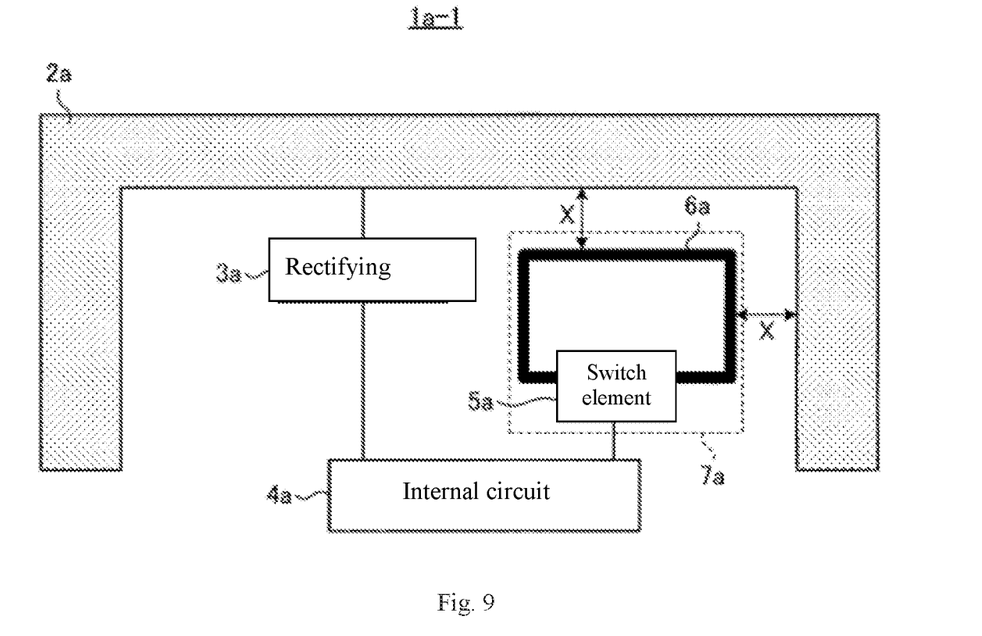
FIG. 9 is a schematic diagram depicting the structure of a wireless communication device according to a variation 1 of the embodiment 2 of the present invention.

FIG. 9 is a diagram depicting the structure according to a variation 1 of the embodiment 2. In a wireless communication device 1a-1 depicted in FIG. 9, the distance between the antenna 2a and each of those two sides of the coupling wiring 6a in the switch circuit that are opposing to the antenna 2a is the shortest distance X. In this regard, the wiring width, length, and the like of the coupling wiring 6a are arbitrarily selected and can be suitably adjusted. The shapes of the antenna and the coupling wiring are not limited to those in FIG. 9. For example, it is also possible that the coupling wiring has three or more sides, among which three or more sides can be opposing to the antenna. Also in such a case, the distance between the antenna and each of the sides opposing the antenna only needs to be the shortest distance X.

(Variation 2)

Figure 10A:
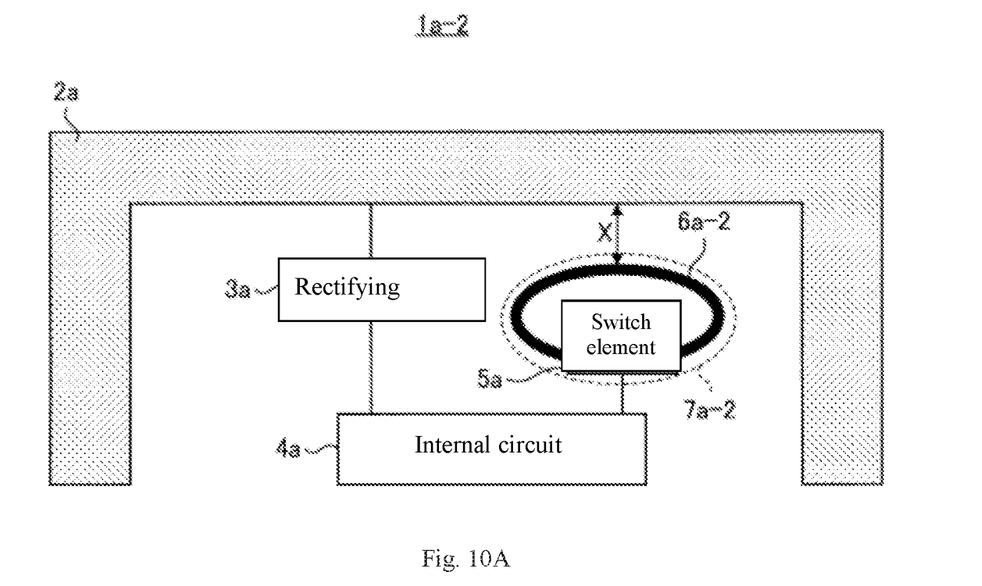
FIG. 10A is a schematic diagram depicting a first example of the structure of a wireless communication device according to a variation 2 of the embodiment 2 of the present invention.
Figure 10B:
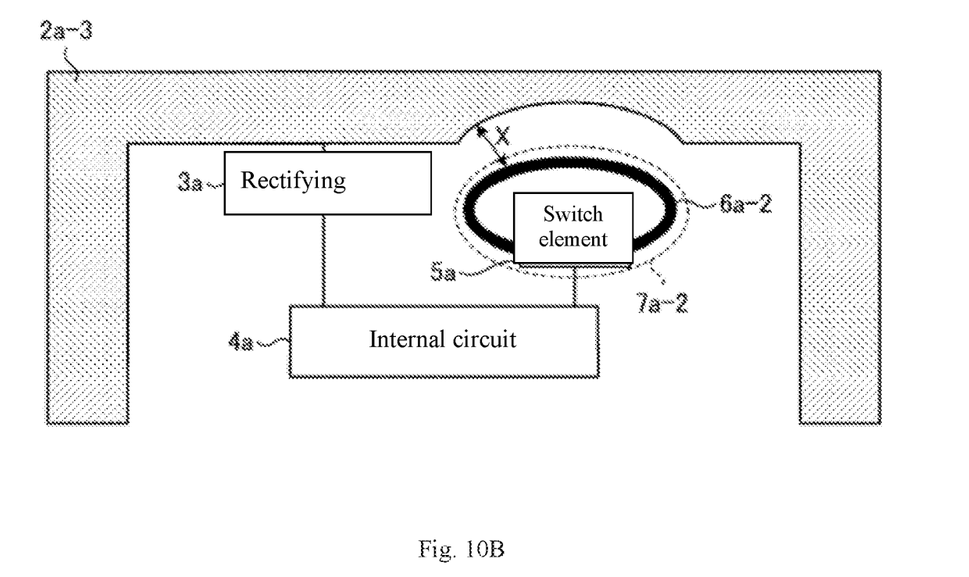
FIG. 10B is a schematic diagram depicting a second example of the structure of the wireless communication device according to the variation 2 of the embodiment 2 of the present invention.

FIG. 10A and FIG. 10B are each a diagram depicting the structure according to a variation 2 of the embodiment 2. In a wireless communication device 1a-2 depicted in FIG. 10A, the coupling wiring 6a-2 in the switch circuit 7a-2 is elliptical. Furthermore, as in a wireless communication device 1a-3 depicted in FIG. 10B, it is more preferable that a part of the inner face of an antenna 2a-3 is recessed to conform to a part of the same elliptical shape as a coupling wiring 6a-2 has, and that the coupling wiring 6a-2 is conformably opposing to the part of the inner face. In this regard, the wiring width, length, and the like of the coupling wiring 6a-2 are arbitrarily selected and can be suitably adjusted.

(Variation 3)

Figure 11A:
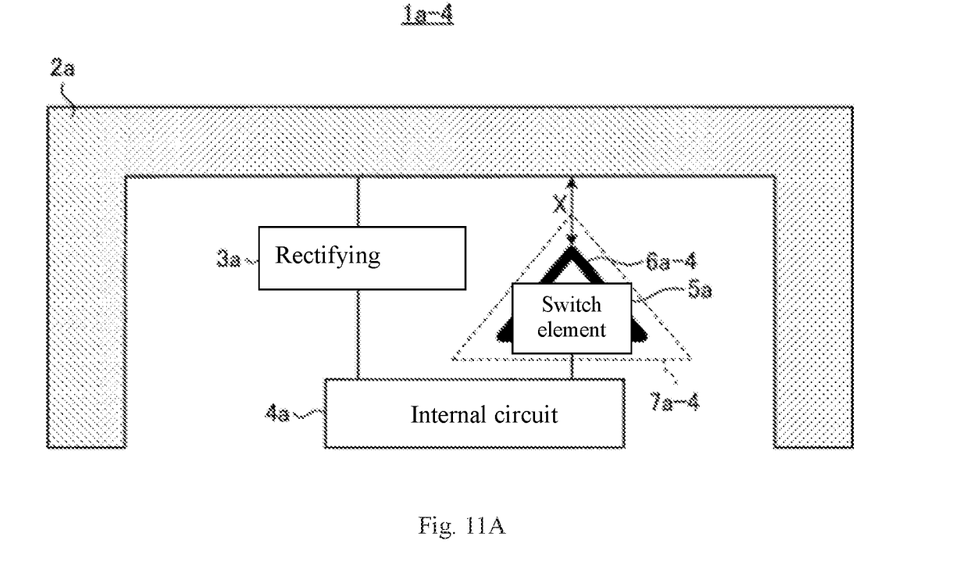
FIG. 11A is a schematic diagram depicting a first example of the structure of a wireless communication device according to a variation 3 of the embodiment 2 of the present invention.
Figure 11B:
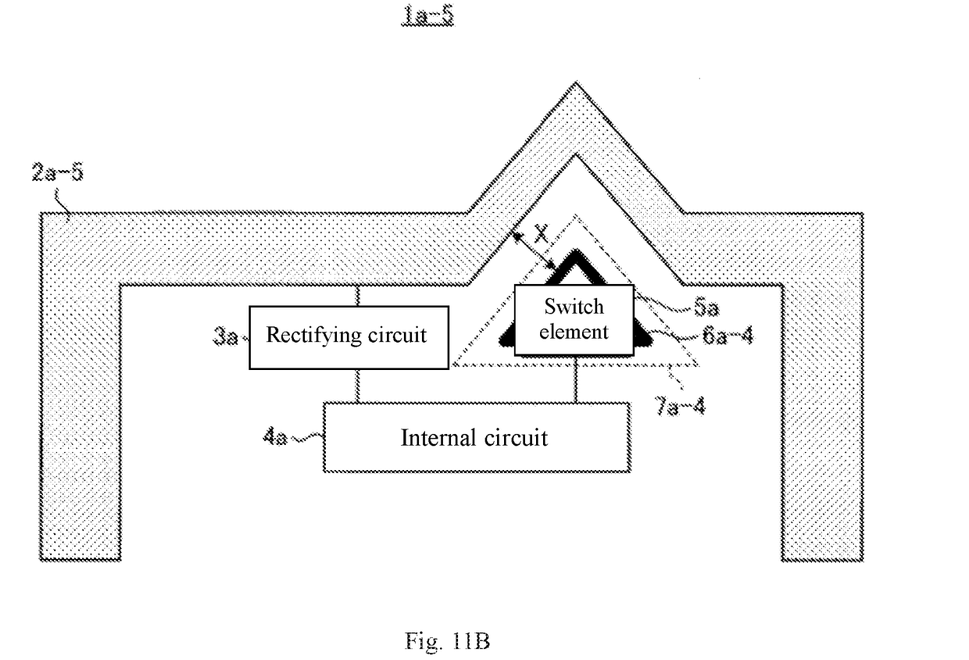
FIG. 11B is a schematic diagram depicting a second example of the structure of the wireless communication device according to the variation 3 of the embodiment 2 of the present invention.

FIG. 11A and FIG. 11B are each a diagram depicting the structure according to a variation 3 of the embodiment 2. In a wireless communication device 1a-4 depicted in FIG. 1A, the coupling wiring 6a-4 in the switch circuit 7a-4 is triangular. Furthermore, as in a wireless communication device 1a-5 depicted in FIG. 11B, it is more preferable that a part of the inner face of an antenna 2a-5 is recessed to conform to a part of the same triangular shape as a coupling wiring 6a-4 has, and that the coupling wiring 6a-4 is conformably opposing to the part of the inner face. In this regard, the wiring width, length, and the like of the coupling wiring 6a-4 are arbitrarily selected and can be suitably adjusted.

(Variation 4)

Figure 12:
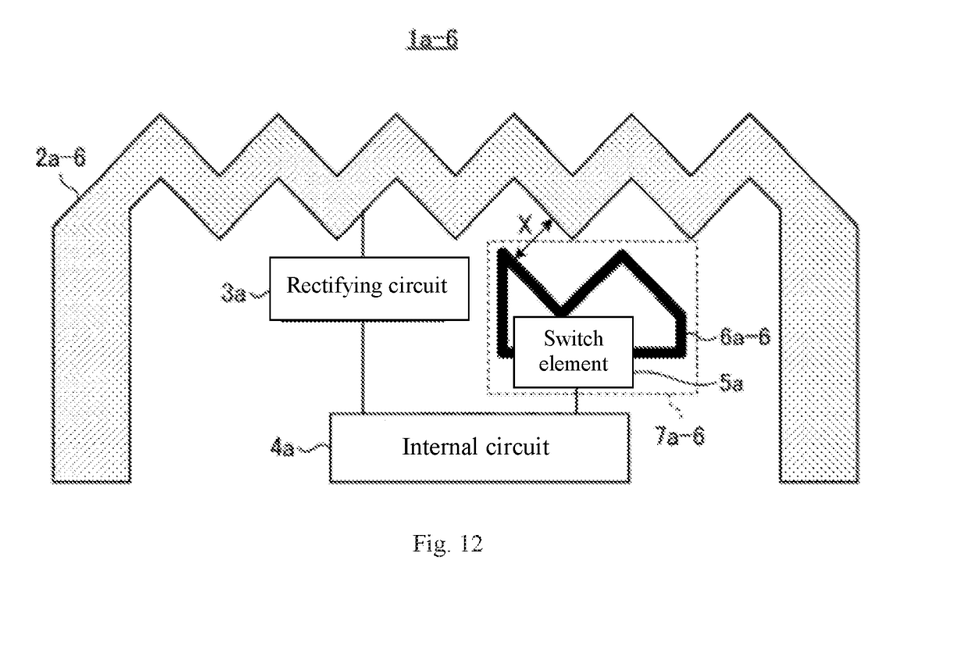
FIG. 12 is a schematic diagram depicting the structure of a wireless communication device according to a variation 4 of the embodiment 2 of the present invention.

FIG. 12 is a diagram depicting the structure according to a variation 4 of the embodiment 2. In a wireless communication device 1a-6 depicted in FIG. 12, the coupling wiring 6a-6 in the switch circuit 7a-6 is in a meander shape along a part of a side of the zigzag shape of the antenna 2a-6. The wiring width, length, and the like of the coupling wiring 6a-6 are arbitrarily selected and can be suitably adjusted.

(Variation 5)

Figure 13:
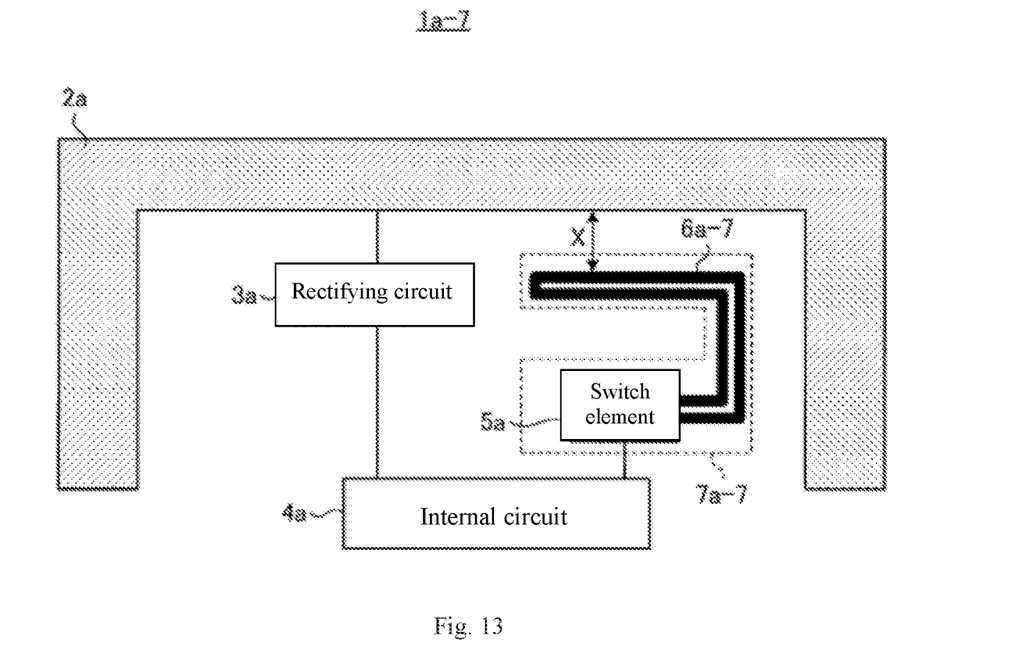
FIG. 13 is a schematic diagram depicting the structure of a wireless communication device according to a variation 5 of the embodiment 2 of the present invention.

FIG. 13 is a diagram depicting the structure according to a variation 5 of the embodiment 2. In a wireless communication device 1a-7 depicted in FIG. 13, the coupling wiring 6a-7 in the switch circuit 7a-7 is loop-shaped along the antenna 2a, and the appearance of the coupling wiring is generally L-shaped. Using the coupling wiring 6a-7 having such a shape enables the area of the switch circuit 7a-7 to be reduced. The wiring width, length, and the like of the coupling wiring 6a-7 are arbitrarily selected and can be suitably adjusted.

(Variation 6)

Figure 14:
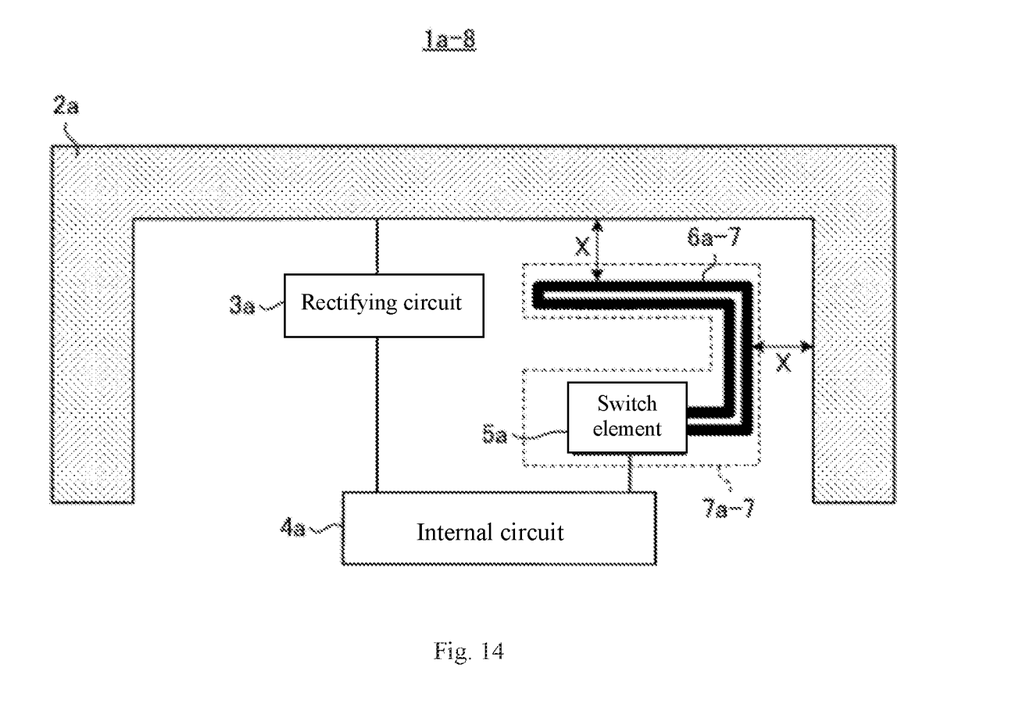
FIG. 14 is a schematic diagram depicting the structure of a wireless communication device according to a variation 6 of the embodiment 2 of the present invention.

FIG. 14 is a diagram depicting the structure according to a variation 6 of the embodiment 2. In a wireless communication device 1a-8 depicted in FIG. 14, the distance between the antenna 2a and each of those two sides of the coupling wiring 6a-7 in the switch circuit 7a-7 that are opposing to the antenna 2a is the shortest distance X. The shapes of the antenna and the coupling wiring are not limited to those in FIG. 14. For example, it is also possible that the coupling wiring has three or more sides, among which three or more sides can be opposing to the antenna. Also in such a case, the distance between the antenna and each of the sides opposing the antenna only needs to be the shortest distance X.

(Variation 7)

Figure 15:
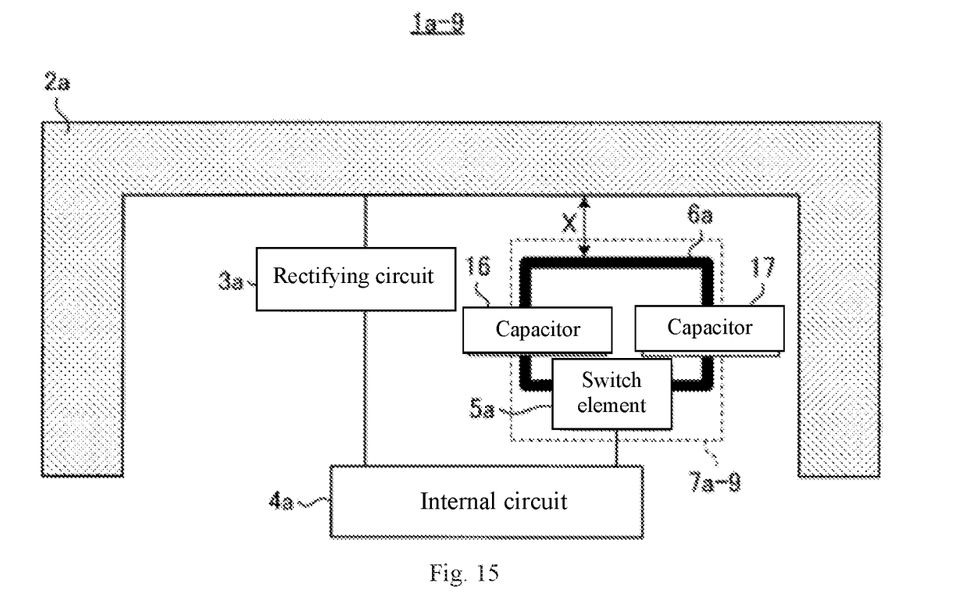
FIG. 15 is a schematic diagram depicting the structure of a wireless communication device according to a variation 7 of the embodiment 2 of the present invention.

FIG. 15 is a diagram depicting the structure according to a variation 7 of the embodiment 2. In a wireless communication device 1a-9 depicted in FIG. 15, capacitors 16 and 17 are inserted between the switch element 5a and the coupling wiring 6a in the switch circuit 7a-9. In this case, the wiring width, length, and the like are arbitrarily selected and can be suitably adjusted. In addition, the capacitors 16 and 17 only need to be each a capacitance component and is not limited to any of those which are commonly used, and a material to be used and the shape thereof are each not limited to any particular one. A method of forming a capacitor is not limited to any particular one, and examples thereof include the same method as the above-mentioned methods of forming an electrode and of forming an insulating layer. In addition, the number of capacitors to be inserted is not limited to two but may be one or three or more, and the capacitance value of each capacitor only needs to be suitably selected.

These variations are only examples, and the coupling wiring may be in arbitrary shape and only needs to be configured not to be connected to or in contact with the antenna or any other circuit or wiring except at the two points of connection with the switch element 5a. In these variations, the coupling wiring has a part extending at a close distance from and generally in parallel with the antenna, and thus, more easily varies the impedance of the antenna through the inductive coupling effect or the like.

The above-described embodiment 2 of the present invention affords the same effects as the embodiment 1.

In the embodiment 1, the return path of the high-frequency electric current passes through the internal circuit, but in the embodiment 2, the high-frequency electric current path is completed in the loop, thus making it possible to simplify the design of the reference potential or the wiring pattern of the internal circuit. Because of this, the embodiment 2 is more preferable.

From the viewpoint of communication sensitivity, the portion along which the distance between the antenna 2a and the coupling wiring 6a-1 is substantially the length of the shortest distance X is preferably longer as in the variation 1 of the embodiment 2, and the area of the switch circuit 7a-7 is preferably configured to be decreased as in the variation 6 of the embodiment 2. Specifically, the length of the coupling wiring is preferably a length of 1/64 wavelengths or more of the communication radio wave, and the length of that portion of the coupling wiring that extends at the shortest distance X from and generally in parallel with the antenna is preferably a length of 1/64 wavelengths or more of the communication radio wave. In addition, it is more preferable that each of the above-mentioned lengths is a length of 1/16 wavelengths or more. On the other hand, from the viewpoint of the power-receiving performance of the antenna, each of the above-mentioned lengths is preferably not too long, and is preferably a length of 1/4 wavelengths or less of the communication radio wave.

The wavelength region of the communication radio wave is preferably the HF band, VHF band, and UHF band, and is more preferably the UHF band.

Embodiment 3

Figure 16:
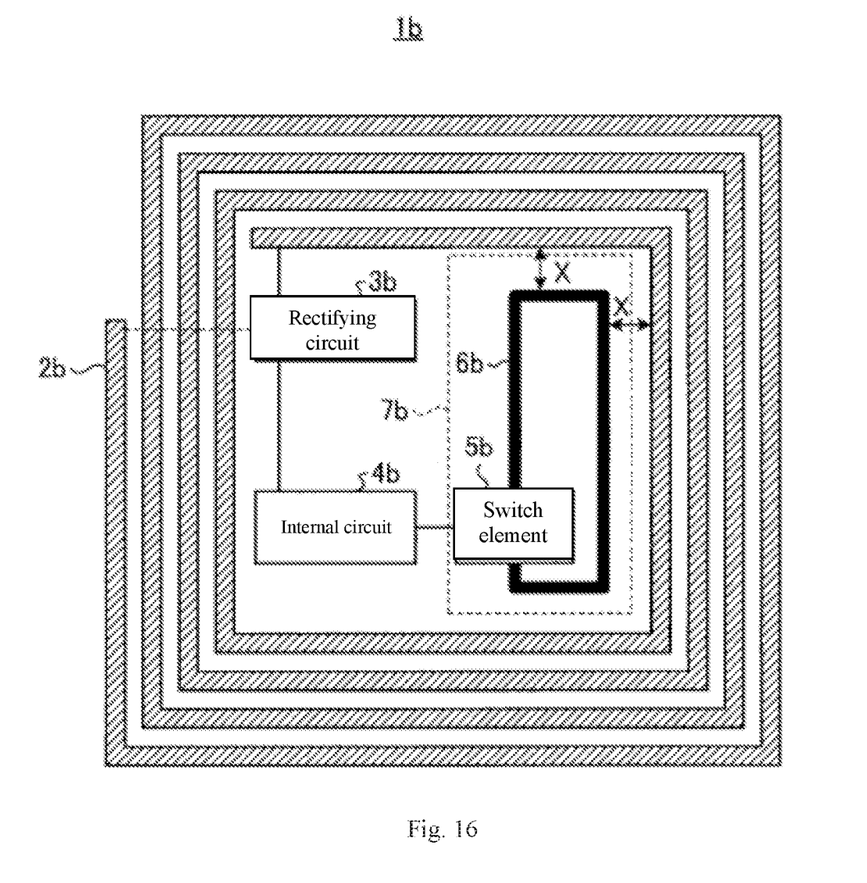
FIG. 16 is a schematic diagram depicting the structure of a wireless communication device according to an embodiment 3 of the present invention.

A wireless communication device according to an embodiment 3 of the present invention has a structure depicted in FIG. 16. A wireless communication device 1b depicted in FIG. 16 includes an antenna 2b, rectifying circuit 3b, internal circuit 4b, and switch circuit 7b. The antenna 2b is in the shape of a coil suitable for the HF band. The switch circuit 7b has a switch element 5b and a coupling wiring 6b. The configurations of the rectifying circuit 3b, internal circuit 4b, and switch circuit 7b are the same as the configurations of the rectifying circuit, internal circuit, and switch circuit respectively in any one of the wireless communication devices described for the embodiment 1 and the embodiment 2. In FIG. 16, the coupling wiring 6b is loop-shaped, and two sides thereof are disposed at the shortest distance X from and along two sides of the innermost loop of the antenna 2b. In this regard, the coupling wiring 6b may be in arbitrary shape and only needs to be configured not to be connected to or in contact with the antenna 2b or any other circuit or wiring except at the points of connection with the switch element 5b. From the viewpoint of communication sensitivity, the length of the portion along which the distance between the antenna 2b and the coupling wiring 6b is substantially the length of the shortest distance X is preferably approximately 10% of the length of the antenna 2b.

The above-described embodiment 3 of the present invention affords the same effects as the embodiment 1 and the embodiment 2.

In FIG. 16, the antenna 2b is in the shape of square loops, and the coupling wiring 6b is accordingly in square shape, but the antenna is more commonly in the shape of polygonal loops. In this case, the shape of the coupling wiring can be selected in accordance with the shape of the antenna. Specifically, the distance between the antenna and that side of the sides of the coupling wiring which is opposing to the antenna only needs to be the shortest distance X.

Other Embodiments

As above, some examples have been described, and without limiting the embodiments of the present invention to these, the shape of the antenna, the shape of the coupling wiring, and the position of the switch circuit are arbitrarily selected.

In addition, the antenna and the coupling wiring are depicted in the same plane, but are not necessarily in the same plane but may be three-dimensionally disposed. For example, the configuration may be such that an insulating layer or an insulated substrate is provided on a layer including the antenna, and on the resulting piece, a coupling wiring in a switch circuit is disposed. In this case, the configuration may be such that the position of the antenna and that of the coupling wiring may be at least partially overlapped as the top side (the side shown in FIG. 1 and the like) of the wireless communication device is viewed from above. This is because both can be kept contactless by the existence of the insulating layer or the insulated substrate.

In this regard, the block diagrams of the above-mentioned embodiments and variations can further encompass; various elements not described here, such as capacitors, resistances, diodes, inductors, and transistors; circuits obtained by combining them; and the like.

REFERENCE SIGNS LIST 1, 1-1, 1-2, 1a, 1a-1, 1a-2, 1a-3, 1a-4, 1a-5, 1a-6, 1a-7, 1a-8, 1a-9, 1b Wireless communication device
2, 2a, 2a-3, 2a-5, 2a-6, 2b Antenna
3, 3a, 3b Rectifying circuit
4, 4a, 4b Internal circuit
5, 5a, 5b Switch element
6, 6-1, 6a, 6a-2, 6a-4, 6a-6, 6a-7, 6b Coupling wiring
7, 7-1, 7-2, 7a, 7a-2, 7a-4, 7a-6, 7a-7, 7a-9, 7b Switch circuit
10 Voltage doubler rectifying circuit diagram
11 and 12 Diode 13, 14, 15, 16, and 17 Capacitor
20 Diode-connected field-effect transistor
21 Source electrode
22 Gate electrode
23 Drain electrode
24 Substrate
25 Insulating layer
26 Semiconductor layer
27 Wiring
30, 40 Field-effect transistor
31, 41 Source electrode
32, 42 Gate electrode
33, 43 Drain electrode
34, 44 Substrate
35, 45 Insulating layer
36, 46 Semiconductor layer
A, B Input terminal of voltage doubler rectifying circuit
C, D Output terminal of voltage doubler rectifying circuit
X Distance between antenna and coupling wiring in the switch circuit

The invention claimed is:

1. A wireless communication device comprising:
an antenna for transmitting and receiving a radio wave to and from a reader/writer,
a rectifying circuit that is connected to said antenna and rectifies said radio wave received by said antenna to generate voltage,
a logic circuit driven by said voltage generated by said rectifying circuit, wherein an output of the rectifying circuit is connected to an input of the logic circuit for supplying said voltage to the logic circuit, and
a switch circuit that is disposed contactlessly with respect to said antenna and operates on the basis of an output signal of said logic circuit,
wherein the switch circuit includes a wiring and a switch element, an output of the logic circuit is connected to the switch element such that the switch element is switched between an ON condition and an OFF condition in response to the operation of the logic circuit, and the operation of said switch element varies the impedance of said antenna.

2. The wireless communication device according to claim 1, wherein said wiring included in said switch circuit is a coupling wiring, said coupling wiring is connected to said switch element, and at least a part of said coupling wiring is disposed contactlessly near said antenna.

3. The wireless communication device according to claim 2, wherein at least a part of said coupling wiring is disposed generally in parallel with said antenna.

4. The wireless communication device according to claim 1, wherein the shortest distance between said antenna and said switch circuit is 1 cm or less.

5. The wireless communication device according to claim 1, wherein the length of said wiring included in said switch circuit is 1/64 wavelengths or more of a communication radio wave.

6. The wireless communication device according to claim 1, wherein said wiring included in said switch circuit is loop-shaped.

7. The wireless communication device according to claim 6, wherein the length of said loop-shaped wiring included in said switch circuit is 1/64 wavelengths or more of a communication radio wave.

8. The wireless communication device according to claim 1, wherein said rectifying circuit is a voltage doubler rectifying circuit.

9. The wireless communication device according to claim 1, wherein said rectifying circuit comprises a rectifying element having a semiconductor coating layer.

10. The wireless communication device according to claim 1, wherein said rectifying circuit comprises a rectifying element having a semiconductor layer that contains carbon nanotubes, wherein a conjugated polymer is attached to at least a part of the surface of said carbon nanotube.

11. The wireless communication device according to claim 1, wherein the antenna is configured to transmit a response signal to the reader/writer.

12. The wireless communication device according to claim 1, wherein the shortest distance between said antenna and said switch circuit is approximately a half wavelength or less of the radio wave.

13. The wireless communication device according to claim 1, wherein the switch element includes a source electrode, a gate electrode, a drain electrode and a semiconductor layer formed between the source electrode and the drain electrode, the gate electrode is electrically connected to the output of the logic circuit, and the drain electrode is electrically connected to the wiring.

14. A wireless communication device comprising:
an antenna for transmitting and receiving a radio wave,
a rectifying circuit that is connected to said antenna and rectifies said radio wave received by said antenna to generate voltage,
a logic circuit that operates by said voltage generated by said rectifying circuit, and
a switch circuit that is disposed contactlessly with respect to said antenna and operates on the basis of an output signal of said logic circuit,
wherein the switch circuit includes a wiring and a switch element, and the operation of said switch element varies the impedance of said antenna, and
wherein the length of said wiring included in said switch circuit is 1/64 wavelengths or more of a communication radio wave.

15. A wireless communication device comprising:
an antenna for transmitting and receiving a radio wave,
a rectifying circuit that is connected to said antenna and rectifies said radio wave received by said antenna to generate voltage,
a logic circuit that operates by said voltage generated by said rectifying circuit, and
a switch circuit that is disposed contactlessly with respect to said antenna and operates on the basis of an output signal of said logic circuit,
wherein the switch circuit includes a wiring and a switch element, and the operation of said switch element varies the impedance of said antenna, and
wherein said wiring included in said switch circuit is loop-shaped.

* * * * *